US012694275B2

(12) United States Patent
Dave et al.

(10) Patent No.: US 12,694,275 B2
(45) Date of Patent: Jul. 28, 2026

(54) EXTREME CLASSIFICATION PROCESSING USING GRAPHS AND NEURAL NETWORKS

(71) Applicant: Microsoft Technology Licensing, LLC, Redmond, WA (US)

(72) Inventors: Kushal Dave, Milpitas, CA (US); Deepak Saini, Bengaluru (IN); Arnav Kumar Jain, Patna (IN); Jian Jiao, Bellevue, WA (US); Amit Kumar Rambachan Singh, Bengaluru (IN); Ruofei Zhang, Mountain View, CA (US); Manik Varma, New Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 532 days.

(21) Appl. No.: 18/278,361

(22) PCT Filed: Apr. 12, 2021

(86) PCT No.: PCT/US2021/026820
§ 371 (c)(1),
(2) Date: Aug. 22, 2023

(87) PCT Pub. No.: WO2022/182372
PCT Pub. Date: Sep. 1, 2022

(65) Prior Publication Data
US 2024/0054326 A1 Feb. 15, 2024

(51) Int. Cl.
*G06N 3/0464* (2023.01)
*G06N 3/096* (2023.01)

(52) U.S. Cl.
CPC ........... *G06N 3/0464* (2023.01); *G06N 3/096* (2023.01)

(58) Field of Classification Search
CPC .................................................. G06N 3/0464
See application file for complete search history.

(56) References Cited

U.S. PATENT DOCUMENTS 12,323,633 B2 * 6/2025 Galpin ................... H04N 19/56
2002/0099947 A1 7/2002 Evans et al.
(Continued)

FOREIGN PATENT DOCUMENTS

CN 112256866 A 1/2021
KR 20200103170 A 9/2020

OTHER PUBLICATIONS

Notice Of Grant Received for Chinese Application No. 202180094676. X, mailed on Oct. 20, 2025, 08 pages. (English Translation Provided).

(Continued)

*Primary Examiner* — Simon P Kanaan
(74) *Attorney, Agent, or Firm* — Shook, Hardy & Bacon L.L.P.

(57) ABSTRACT

Systems and methods are provided for learning classifiers for annotating a document with predicted labels under extreme classification where there are over a million labels. The learning includes receiving a joint graph including documents and labels as nodes. Multi-dimensional vector representations of a document (i.e., document representations) are generated based on graph convolution of the joint graph. Each document representation varies an extent of reliance on neighboring nodes to accommodate context. The document representations are feature-transformed using a residual layer. Per-label document representations are generated from the transformed document representations based on neighboring label attention. A classifier is trained for each of over a million labels based on joint learning using training data and the per-label document representation. The trained classifier performs highly efficiently as compared to other classifiers trained using disjoint graphs of documents and labels.

15 Claims, 9 Drawing Sheets

(56)                References Cited

U.S. PATENT DOCUMENTS

2020/0210773 A1*  7/2020  Li ........................... G06N 3/047
2020/0226472 A1   7/2020  Shanthamallu
2020/0265112 A1   8/2020  Fox et al.
2020/0364338 A1*  11/2020  Ducau .................... G06N 3/084
2021/0056413 A1*  2/2021  Cheung ............... G06N 3/0464
2021/0158149 A1*  5/2021  Zhang ................. G06N 3/0895

OTHER PUBLICATIONS

First Office Action Received for Chinese Application No. 202180094676.X, mailed on May 31, 2025, 20 Pages (English Translation Provided).
Invitation to file search results or a statement of non-availability pursuant to Rule 70b (1) received in European Application No. 21723493.9, mailed on May 16, 2024, 1 page.
Tu, et al., "Learning to Rank Concept Annotation for Text", Acta Scientiarum Naturalium Universitatis Pekinensis, vol. 49, Issue No. 1, Jan. 2013, pp. 153-158. (Abstract).
Abu-El-Haija, et al., "MixHop: Higher-Order Graph Convolutional Architectures via Sparsified Neighborhood Mixing", In Repository of arXiv:1905.00067v1, Apr. 30, 2019, 9 Pages.
Agrawal, et al., "Multi-label learning with millions of labels: Recommending advertiser bid phrases for web pages", In Proceedings of World Wide Web, May 13, 2013, 11 Pages.
Babbar, et al., "Data scarcity, robustness and extreme multilabel classification", In Journal of Machine Learning, vol. 108, Issue 8, Sep. 15, 2019, pp. 1329-1351.
Babbar, et al., "DiSMEC: Distributed Sparse Machines for Extreme Multi-label Classification", In Proceedings of the Tenth ACM International Conference on Web Search and Data Mining, Feb. 2017, pp. 721-729.
Bahdanau, et al., "Neural Machine Translation by Jointly Learning to Align and Translate", In Repository of arXiv, arXiv:1409.0473, Sep. 1, 2014, pp. 1-15.
Bhatia, et al., "The extreme classification repository: Multi-label datasets and code", Retrieved from: http://manikvarma.org/downloads/XC/XMLRepository.html, 2016, 9 Pages.
Bojanowski, et al., "Enriching Word Vectors with Subword Information", In Journal of Transactions of the Association for Computational Linguistics, vol. 5, Jun. 2017, pp. 135-146.
Bruna, et al., "Spectral networks and locally connected networks on graphs", In Repository of arXiv:1312.6203v1, Dec. 21, 2013, pp. 1-11.
Chang, et al., "Taming Pretrained Transformers for Extreme Multi-label Text Classification", In Proceedings of the 26th ACM SIGKDD International Conference on Knowledge Discovery & Data Mining, Aug. 23, 2020, pp. 3163-3171.
Defferrard, et al., "Convolutional neural networks on graphs with fast localized spectral filtering", In Proceedings of the 30th International Conference on Neural Information Processing Systems, Dec. 5, 2016, 9 Pages.
Devlin, et al., "BERT: Pre-training of Deep Bidirectional Transformers for Language Understanding", In Proceedings of Conference of the North American Chapter of the Association for Computational Linguistics: Human Language Technologies, Jun. 2, 2019, pp. 4171-4186.
Dey, et al., "P-Simrank: Extending Simrank to Scale-Free Bipartite Networks", In Proceedings of the Web Conference, Apr. 2020, pp. 3084-3090.
Gantner, "Personalized ranking for non-uniformly sampled items", In Proceedings of the International Conference on KDD Cup, vol. 18, Jan. 2011, pp. 231-247.
Gehring, et al., "A Convolutional Encoder Model for Neural Machine Translation", In Repository of arXiv:1611.02344v1, Nov. 7, 2016, pp. 1-13.
Gilmer, et al., "Neural message passing for quantum chemistry", In Repository of arXiv:1704.01212v1, Apr. 4, 2017, 13 Pages.

Gori, et al., "A new model for learning in graph domains", In Proceedings of IEEE International Joint Conference on Neural Networks, Jan. 2005, 7 Pages.
Grover, et al., "node2vec: Scalable Feature Learning for Networks", In Proceedings of the 22nd ACM SIGKDD International Conference on Knowledge Discovery and Data Mining, Aug. 13, 2016, pp. 855-864.
Hamilton, et al., "Inductive Representation Learning on Large Graphs", In Proceeding of 31st Conference on Neural Information Processing Systems, Dec. 4, 2017, 11 Pages.
He, et al., "Deep Residual Learning for Image Recognition", In Proceedings of the IEEE Conference on Computer Vision and Pattern Recognition, Jun. 27, 2016, pp. 770-778.
Ioffe, et al., "Batch Normalization: Accelerating Deep Network Training by Reducing Internal Covariate Shift", In Repository of arXiv:1502.03167v1, Feb. 11, 2015, 10 Pages.
Jain, et al., "Extreme Multi-label Loss Functions for Recommendation, Tagging, Ranking & Other Missing Label Applications", In Proceedings of the 22nd ACM SIGKDD International Conference on Knowledge Discovery and Data Mining, Aug. 13, 2016, pp. 935-944.
Jain, et al., "Slice: Scalable Linear Extreme Classifiers Trained on 100 Million Labels for Related Searches", In Proceedings of the Twelfth ACM International Conference on Web Search and Data Mining, Feb. 2019, pp. 528-536.
Khandagale, et al., "Bonsai—Diverse and Shallow Trees for Extreme Multi-label Classification", In Journal of Computing Research Repository, Apr. 2019, 10 Pages.
Kipf, et al., "Semi-Supervised Classification with Graph Convolutional Networks", In Repository of arXiv:1609.02907, Feb. 22, 2017, pp. 1-14.
Kipf, et al., "Semi-Supervised Classification with Graph Convolutional Networks", In Repository of arXiv:1609.02907v1, Sep. 9, 2016, 10 Pages.
Krizhevsky, et al., "ImageNet Classification with Deep Convolutional Neural Networks", In Proceedings of Advances in Neural Information Processing Systems, Dec. 2012, pp. 1-9.
Ledig, et al., "Photo-realistic single image super-resolution using a generative adversarial network", In Proceedings of IEEE Conference on Computer Vision and Pattern Recognition, Jul. 21, 2017, 10 Pages.
Lee, et al., "Local Collaborative Ranking", In Proceedings of the 23rd international conference on World wide web, Apr. 7, 2014, pp. 85-96.
Liu, et al., "Deep Learning for Extreme Multi-label Text Classification", In Proceedings of the 40th International ACM SIGIR Conference on Research and Development in Information Retrieval, Aug. 2017, pp. 115-124.
Liu, et al., "Roberta: A Robustly Optimized BERT Pretraining Approach", In Repository of arXiv:1907.11692, Jul. 26, 2019, 13 Pages.
Lu, et al., "TwinBERT: Distilling knowledge to twin-structured BERT models for efficient retrieval", In Repository of arXiv:2002.06275v1, Feb. 14, 2020, pp. 1-8.
Malkov, et al., "Efficient and robust approximate nearest neighbor search using hierarchical navigable small world graphs", In Proceedings of IEEE transactions on pattern analysis and machine intelligence, vol. 42, Issue: 4, Dec. 28, 2018, pp. 824-836.
Medini, et al., "Extreme Classification in Log Memory using Count-Min Sketch: A Case Study of Amazon Search with 50M Products", In Proceedings of 33rd Conference on Neural Information Processing Systems, Dec. 8, 2019, pp. 1-11.
Mikolov, et al., "Distributed Representations of Words and Phrases and their Compositionality", In Proceedings of 27th Annual Conference on Neural Information Processing Systems, Dec. 5, 2013, pp. 1-9.
Mikolov, et al., "Efficient Estimation of Word Representations in Vector Space", In Repository of arXiv:1301.3781v3, Sep. 7, 2013, pp. 1-12.
Natarajan, et al., "Inductive matrix completion for predicting gene-disease associations", In Journal of Bioinformatics, vol. 30, Issue 12, Jun. 15, 2014, 9 Pages.

(56)        References Cited

OTHER PUBLICATIONS

Paszke, et al., "PyTorch: An imperative style, high-performance deep learning library", In Repository of arXiv:1912.01703v1, Dec. 3, 2019, 12 Pages.

"International Preliminary Report on Patentability Issued in PCT Application No. PCT/US21/026820", Mailed Date: Sep. 7, 2023, 10 Pages.

"International Search Report and Written Opinion Issued in PCT Application No. PCT/US21/026820", Mailed Date: Nov. 24, 2021, 9 Pages.

Prabhu, et al., "Extreme Multi-label Learning with Label Features for Warm-start Tagging, Ranking & Recommendation", In Proceedings of the Eleventh ACM International Conference on Web Search and Data Mining, Feb. 5, 2018, pp. 441-449.

Prabhu, et al., "FastXML: A Fast, Accurate and Stable Tree-classifier for eXtreme Multi-label Learning", In Proceedings of the 20th ACM SIGKDD international conference on Knowledge discovery and data mining, Aug. 24, 2014, 10 Pages.

Prabhu, et al., "Parabel: Partitioned label trees for extreme classification with application to dynamic search advertising", In Proceedings of the World Wide Web Conference, Apr. 23, 2018, pp. 993-1002.

Radford, et al., "Language Models are Unsupervised Multitask Learners", In Journal of OpenAI Blog, vol. 1, Issue 8, Feb. 24, 2019, 24 Pages.

Saini, et al., "GalaXC: Graph Neural Networks with Labelwise Attention for Extreme Classification", In Proceedings of the Web Conference, Apr. 19, 2021, 12 Pages.

Scarselli, et al., "The Graph Neural Network Model", In Journal of IEEE Transactions on Neural Networks, vol. 20, Issue 1, Dec. 9, 2008, pp. 1-32.

Shen, et al., "A Latent Semantic Model with Convolutional-Pooling Structure for Information Retrieval", In the Proceedings of the 23rd ACM International Conference on Conference on Information and Knowledge Management, Nov. 3, 2014, pp. 101-111.

Shen, et al., "Learning Semantic Representations Using Convolutional Neural Networks for Web Search", In Proceedings of the 23rd International Conference on World Wide Web, Apr. 7, 2014, pp. 373-374.

Sperduti, et al., "Supervised neural networks for the classification of structures", In Journal of IEEE Transactions on Neural Networks , vol. 8, Issue 3, May 1997, pp. 714-735.

Velickovic, et al., "Graph Attention Networks", In Repository of arXiv:1710.10903v3, Feb. 4, 2018, pp. 1-12.

Vinyals, et al., "Pointer Networks", In Proceedings of the Neural Information Processing Systems, Dec. 7, 2015, pp. 1-9.

Zhou, et al., "Convolution on Graph: A High-Order and Adaptive Approach", In Repository of arXiv:1706.09916v2, Oct. 20, 2017, 8 Pages.

Wu, et al., "MDAL: Multi-task Dual Attention LSTM Model for Semi-supervised Network Embedding", In International Conference on Database Systems for Advanced Applications, Apr. 24, 2019, pp. 468-483.

Xu, et al., "How powerful are graph neural networks?", In Repository of arXiv:1810.00826v1, Oct. 1, 2018, pp. 1-15.

Xu, et al., "Representation learning on graphs with jumping knowledge networks", In Repository of arXiv:1806.03536v1, Jun. 9, 2018, 14 Pages.

Yang, et al., "XLNet: Generalized Autoregressive Pretraining for Language Understanding", In Proceedings of 33rd Conference on Neural Information Processing Systems, Dec. 8, 2019, 11 Pages.

Yen, et al., "PPDSparse: A Parallel Primal-Dual Sparse Method for Extreme Classification", In Proceedings of the 23rd ACM SIGKDD International Conference on Knowledge Discovery and Data Mining, Aug. 13, 2017, pp. 545-553.

Ying, et al., "Graph Convolutional Neural Networks for Web-Scale Recommender Systems", In Proceedings of the 24th ACM SIGKDD International Conference on Knowledge Discovery & Data Mining, Aug. 19, 2018, pp. 974-983.

You, et al., "AttentionXML: Extreme Multi-Label Text Classification with Multi-Label Attention Based Recurrent Neural Networks", In Repository of arXiv:1811.01727v3, Nov. 4, 2019, pp. 1-17.

Zhang, et al., "Link prediction based on graph neural networks", In Proceedings of Advances in Neural Information Processing Systems, Dec. 3, 2018, pp. 1-11.

Zhang, et al., "Neural IR Meets Graph Embedding: A Ranking Model for Product Search", In the Proceedings of World Wide Web Conference, May 13, 2019, pp. 2390-2400.

* cited by examiner

300

Web Search Activity Log 302 (mapped to nodes)

Activities 304 (originating web queries or web pages)

Query "What is a banana?" on a query page (D1)

Query "What is a banana?" on the query page (D1)

Jump to a search-by-image page (D1)

Fruit Dictionary (L1)

Banana World (L2)

Banana World (L2)

Banana-details (D3) in the query page for web search

Image Search using a yellow banana photo (D2)

Image Search using a banana split (L3)

⋮

Results 306 (resulting or destination web pages)

→Fruit Directory (L1)

→Banana World (L2)

→Image Search page (D2)

→Banana-details (D3)

→Colors of Banana (D4)

→Farms for growing Banana trees (D5)

→New-Banana-Details website as a search result (L4)

→A web page of yellow banana photos (L3)

→An ice cream shop (L8)

⋮

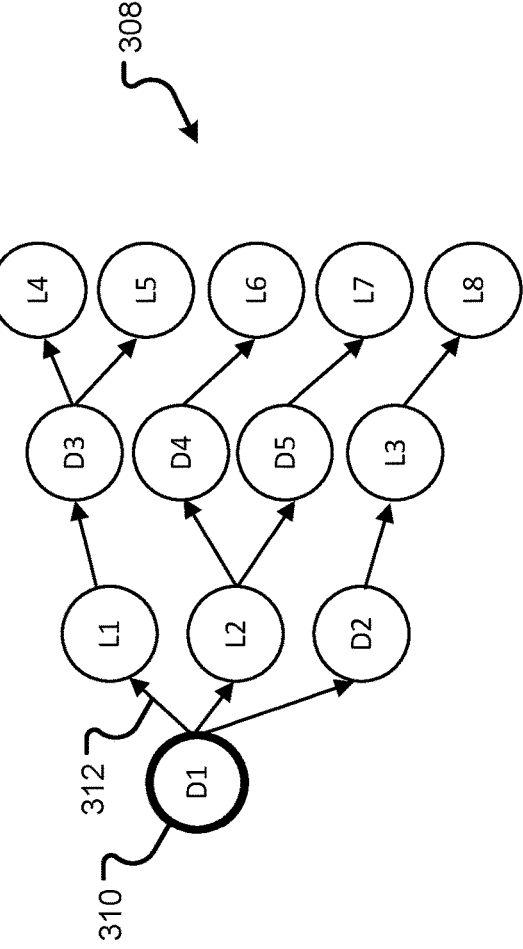

Sponsored Search Activity Log 402 (mapped to nodes)

Activities 404

Query "What is a banana?" on a query page (D1)
Query "What is a banana?" on the query page (D1)
Jump to a search-by-image page (D1)
Fresh Fruit Mart – Banana Special! (L1)
Vitamin Supplement Store – Vitamin C (L2)
Vitamin Supplement Store – Vitamin C (L2)
Everything about Banana website (D3)
Image Query page using a yellow banana photo (D2)
Vacation Tour to Tropical Fruit Farm (L3)

...

Results 406 (Resulting Directed Content or Web Ads)

→ Fresh Fruit Mart – Banana Special! (L1)
→ Vitamin Supplement Store – Vitamin C (L2)
→ Image Search Top Page (D2)
→ Everything about Banana website (D3)
→ Vitamin Encyclopedia – Vitamin C (D4)
→ Vitamin Encyclopedia – Vitamin B6 (D5)
→ Everything about Mango website (D3)
→ Vacation Tour to Tropical Fruit Farm (L3)
→ ACME Travel Insurace (L8)

...

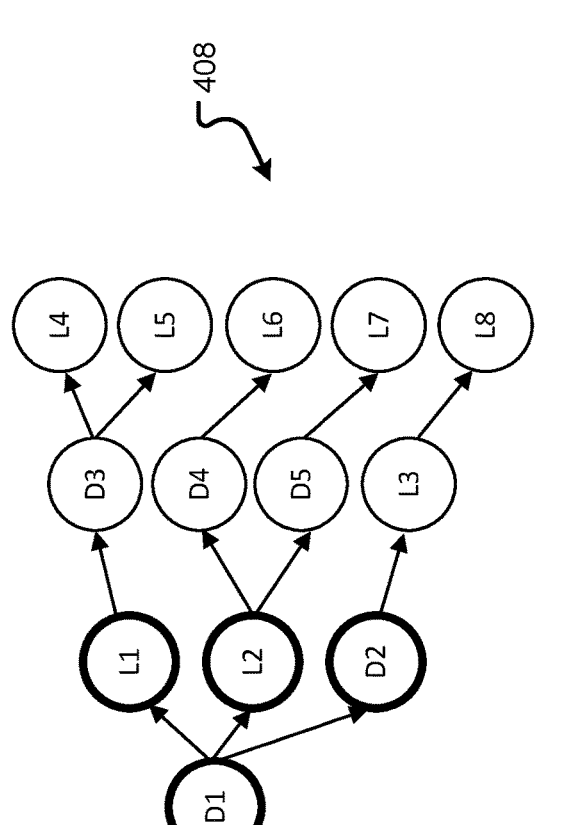

EXTREME CLASSIFICATION PROCESSING USING GRAPHS AND NEURAL NETWORKS

CROSS-REFERENCE TO RELATED APPLICATIONS

This application is the U.S. national phase of the International Patent Application PCT/US2021/026820, filed Apr. 12, 2021, which claims the benefit of Indian Patent Application number 202141008391, filed Feb. 27, 2021, the entire contents of all are incorporated herein by reference.

BACKGROUND

Traditional systems provide recommendations as a result of receiving a search query by determining the recommendations from a set of candidates. These systems analyze and classify words or contexts of a received search query into one or more of thousands of candidate classes. These classification systems may be in a variety of applications (e.g., web searches, product recommendations, and query rewriting, etc.). In practice, accuracy of the recommendations becomes an issue when a size of the candidate classes is not sufficiently large. For instance, a set of candidate classes (e.g., thousands of classes) may not necessarily include a candidate that accurately reflects a desired recommendation from among millions of possible recommendations. Increased accuracy in providing recommendations would require many, many more candidate classes. In fact, not just thousands but millions of candidate classes would be needed without sacrificing performance in either training or classification. Thus, developing a technology that better meets these requirements with sufficient performance both in training and in prediction stages of a classification system would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by training an extreme classification system by generating a set of classifiers based on a joint graph of documents and labels. In aspects, a "document" may refer to an input to the system and a "label" may refer to an output of the system.

The present disclosure relates to generating a set of classifiers during a training process of a classification system based on a joint graph of documents and labels. Thereafter, the trained classification system can be used in a prediction stage to annotate a given document with the most relevant subset of labels from an extremely large set of labels (e.g., millions of labels). In particular, the joint graph includes a combination of documents and labels as nodes, with relationships between at least a pair of documents and labels as edges. A graph convolution is performed on nodes neighboring a node to generate document representations for learning. In aspects, a set of multiple vector representations of a document node may be generated based on successively increasing the "neighborhood" of nodes with respect to the document node within the joint graph. For instance, with respect to a document node, first nodes may have a direct relationship (or edge) with the document node, second nodes may have a direct relationship with the first nodes, and third nodes may have a direct relationship with the second nodes, and so on. A "first hop" from the document node may refer to a first neighborhood level including the first nodes, a "second hop" from the document node may refer to a second neighborhood level including the first and second nodes, a "third hop" from the document node may refer to a third neighborhood level including the first, second, and third nodes, and so on. In aspects, information from nodes (or labels) may become more general as hops increase from the document node and include more neighboring nodes (or labels). Vector representations of the document node may be weighted differently based on the number of "hops" (or the neighborhood level) from the document node. In aspects, a vector representation of the document node within a particular number of hops in the joint graph may be weighted over another vector representation of the document node within another numbers of hops.

A feature label generator generates a vector representation of the document representation for each of an extremely large number of labels (e.g., millions of labels) based on a label attention. Each of the per-label document representations includes a label attention to one of the document representations having a specified number of hops based on a position (e.g., a head label or a tail label) of the label in the graph. A label "attention" weighs one or more features of neighboring nodes in the joint graph to generate the document representation for the label. The output of the feature label generator based on the label attentions is millions of document representations, a document representation for each of the millions of labels. In some aspects, the present disclosure then learns a separate classifier for each label based on per-label document representations as input. In some other aspects, use of a shortlist during training and prediction may reduce a number of classifiers to process for improvement in performance Accuracy of predicting or recommending candidates for a given query improves based on classifications using the extremely large number of classifiers for respective labels.

The disclosed technology includes a training process and a prediction process of a classification system. The training process is the primary focus of the present disclosure. The process may include one or more of graph convolution, feature transformation, feature label attention, and classifier generation. The graph convolution includes generating vector representations of documents based on varying numbers of hops from respective document nodes within a joint graph of documents and labels. The feature transformation includes transforming the vector representations of documents based on residual layers with skip connections. The feature label attention generates a separate document representation for each label. Each label attends different hops of neighborhoods differently depending on whether the nodes correspond to head labels or tail labels in the joint graph. Adjusting a range of neighbors in the joint graph for the label attention provides sufficient amount of information to provide accuracy in labeling documents.

Some examples include a method for training a classifier. The method may include receiving a joint graph, wherein the joint graph includes nodes and directional edges, and wherein each node is either a document type or a label type, generating, based on graph convolution of the joint graph, a plurality of multi-dimensional vector representations of a document, wherein the document is represented by a document node in the joint graph, and wherein each multi-dimensional vector representation of the document corresponds to a distinct level of neighboring nodes from the document node in the joint graph, generating, using a residual layer of a neural network, transformed multi-dimensional vector representations of the document based on the generated plurality of multi-dimensional vector representations of the document, wherein the residual layer includes a residual network and a skip connection, generating, using label attention, a plurality of per-label multi-dimensional vector representations of the document, wherein each per-label multi-dimensional vector representation of the document corresponds to a label of a plurality of labels, and wherein the label attention applies a variable weighting to one or more of the transformed multi-dimensional vector representations of the document to generate the per-label multi-dimensional vector representations, training a classifier for each label of the plurality of labels, and transmitting a plurality of trained classifiers for deployment in a label prediction process. The level of neighboring nodes from the document node corresponds to a number of hops from the document node in the joint graph, and wherein the label attention for a tail label places a higher weighting on a multi-dimensional vector representation of the document generated based on a higher level of neighboring nodes. The plurality of multi-dimensional vector representation of the document includes a first multi-dimensional vector representation based on nodes within one hop from the document node, a second multi-dimensional vector representation based on nodes within two hops from the document node, a third multi-dimensional vector representation based on nodes within three hops from the document node. The graph convolution includes vectorising features of documents and labels associated with nodes within a predetermined number of hopes from the document node to generate the multi-dimensional vector representations of the document. A number of the plurality of labels is at least a million, and wherein a number of the plurality of per-label multi-dimensional vector representation of the document is at least a million. The method may further comprise deploying the plurality of trained classifiers for a label prediction process, receiving a document, generating, using a subset of the plurality of trained classifiers, a set of recommendation candidate labels for the received document, and transmitting the generated recommendation candidate labels as a response to the document.

Some examples include a system for learning classifiers for labels in an extreme classification processing. The system comprises a processor, and a memory storing computer-executable instructions that when executed by the processor cause the system to: receive a joint graph, wherein the joint graph includes nodes and directional edges, and wherein each node is either a document type or a label type, generate, based on graph convolution of the joint graph, a plurality of multi-dimensional vector representations of a document, wherein the document is represented by a document node in the joint graph, and wherein each multi-dimensional vector representation of the document corresponds to a distinct level of neighboring nodes from the document node in the joint graph, generate, using a residual layer of a neural network, transformed multi-dimensional vector representations of the document based on the generated plurality of multi-dimensional vector representations of the document, wherein the residual layer includes a residual network and a skip connection, generate, using label attention, a plurality of per-label multi-dimensional vector representations of the document, wherein each per-label multi-dimensional vector representation of the document corresponds to a label of a plurality of labels, and wherein the label attention applies a variable weighting to one or more of the transformed multi-dimensional vector representations of the document to generate the per-label multi-dimensional vector representations, train a classifier for each label of the plurality of labels, and transmit a plurality of trained classifiers for deployment in a label prediction process. The level of neighboring nodes from the document node corresponds to a number of hops from the document node in the joint graph, and wherein the label attention for a tail label places a higher weighting on a multi-dimensional vector representation of the document generated based on a higher level of neighboring nodes. The plurality of multi-dimensional vector representation of the document includes a first multi-dimensional vector representation based on nodes within one hop from the document node, a second multi-dimensional vector representation based on nodes within two hops from the document node, a third multi-dimensional vector representation based on nodes within three hops from the document node. The graph convolution includes vectorising features of documents and labels associated with nodes within a predetermined number of hopes from the document node to generate the multi-dimensional vector representations of the document. The computer-executable instructions when executed further causing the system to: deploy the plurality of trained classifiers for a label prediction process, receive a document, generate, using a subset of the plurality of trained classifiers, a set of recommendation candidate labels for the received document, and transmit the generated recommendation candidate labels as a response to the document. The document includes at least one of: a webpage as a search result in the web search application, a piece of directed content in the sponsored search application, another product in the product recommendation application, or another content title in a content recommendation application, and wherein the label includes at least one of: a query in a web search application, a query in a sponsored search application, a product in a product recommendation application, or a content title in a content recommendation application. The computer-executable instructions when executed further causing the system to: generate a set of classifiers for learning; and learn each classifier of the set of classifiers in a batch processing.

Some examples include a computer-readable non-transitory recording medium storing computer-executable instructions. The computer-readable non-transitory recording medium may store computer-executable instructions that when executed by a processor cause a computer system to: receive a joint graph, wherein the joint graph includes nodes and directional edges, and wherein each node is either a document type or a label type, generate, based on graph convolution of the joint graph, a plurality of multi-dimensional vector representations of a document, wherein the document is represented by a document node in the joint graph, and wherein each multi-dimensional vector representation of the document corresponds to a distinct level of neighboring nodes from the document node in the joint graph, generate, using a residual layer of a neural network, transformed multi-dimensional vector representations of the document based on the generated plurality of multi-dimensional vector representations of the document, wherein the residual layer includes a residual network and a skip connection, generate, using label attention, a plurality of per-label multi-dimensional vector representations of the document, wherein each per-label multi-dimensional vector representation of the document corresponds to a label of a plurality of labels, and wherein the label attention applies a variable weighting to one or more of the transformed multi-dimensional vector representations of the document to generate the per-label multi-dimensional vector representations, train a classifier for each label of the plurality of labels, and transmit a plurality of trained classifiers for deployment in a label prediction process. The level of neighboring nodes from the document node corresponds to a number of hops from the document node in the joint graph, and wherein the label attention for a tail label places a higher weighting on a multi-dimensional vector representation of the document generated based on a higher level of neighboring nodes. The plurality of multi-dimensional vector representation of the document includes a first multi-dimensional vector representation based on nodes within one hop from the document node, a second multi-dimensional vector representation based on nodes within two hops from the document node, a third multi-dimensional vector representation based on nodes within three hops from the document node. The computer-executable instructions when executed further causing the system to: deploy the plurality of trained classifiers for a label prediction process, receive a document, generate, using a subset of the plurality of trained classifiers, a set of recommendation candidate labels for the received document, and transmit the generated recommendation candidate labels as a response to the document. The document includes at least one of: a webpage as a search result in the web search application, a piece of directed content in the sponsored search application, another product in the product recommendation application, or another content title in a content recommendation application, and the label includes at least one of: a query in a web search application, a query in a sponsored search application, a product in a product recommendation application, or a content title in a content recommendation application.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3 illustrates an example of data structures for generating a joint graph in accordance with aspects of the present disclosure.

FIG. 4 illustrates an example of data structures for generating a joint graph in accordance with aspects of the present disclosure.

DETAILED DESCRIPTION

Figure 1:
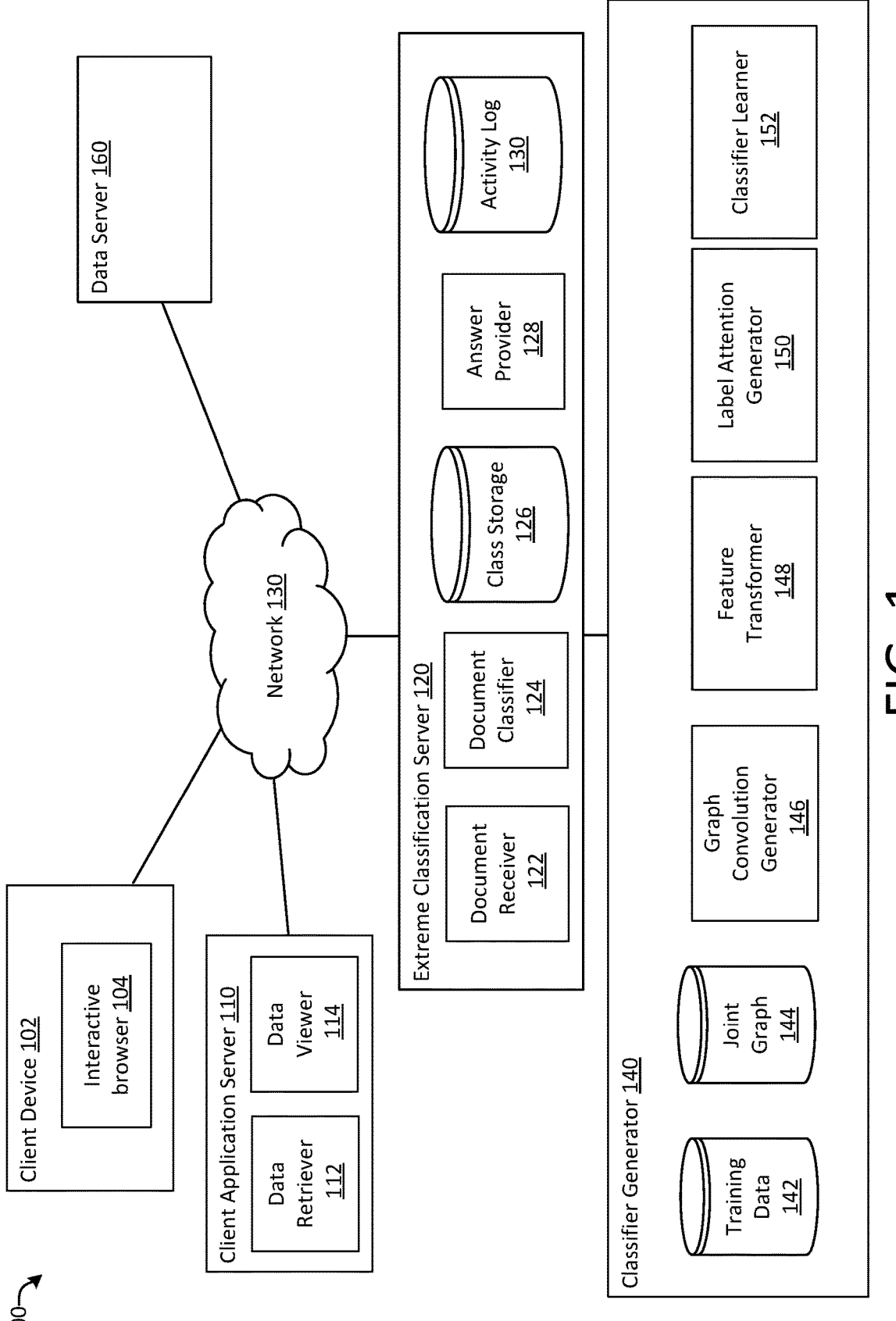
FIG. 1 illustrates an overview of an example system for training classifiers and predicting labels in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Classifying information relies on understanding a given piece of information (e.g., a document) and determining a subset of classes or labels from a set of classes or labels in the given information. A variety of applications use classification systems to generate and provide recommendations based on a given query. For example, a web search application provides a set of webpages (e.g., addresses of the webpages) which matches with a given query. Many of web search sites provide a sponsored search that display directed content (e.g., web advertisements) along search results based on the given query. A product recommendation application provides a set of recommended products based on a given product or a query for products.

In aspects, a document may be a given query in a web search or in recommending a web advertisement, a given product in product recommendations, or a given movie in movie recommendations. A label may be synonymous to a class. In some aspect, a label may be each recommended website of the set of websites in response to a query in a web search, a piece of web advertisement (or direct content) in a sponsored search, each product of the set of product recommendations, or each recommended movie of the set of movies in movie recommendation. In some other aspects, a label may be a set of websites in response to a query in a web search, a web advertisement (or directed content) in a sponsored search, a set of products as recommendations for given product in product recommendations, or a set of movies as recommendations for a given movie title in movie recommendation.

As a number of potential results grows, the classification systems selects candidate recommendations from a growing number of webpages, products, and directed content respectively. Consequently, as the number of potential results grows, providing accurate recommendations requires analyzing of individual content and products. A latency associated with generating recommendations may become prohibitively high when there is an extremely large set of candidate labels, more than a million candidate labels, for example.

Extreme Classification (XC) involves performing a task to annotate a document with the most relevant subset of labels of an extremely large set of candidate labels as recommended labels. Some XC systems learn documents and labels as two disjoint sets. Some other XC processing fails to include metadata of labels in generating and training classifiers because of the large number of labels to train. The present application enables efficiently training an XC processing system by generating document representations based on a joint graph including documents and labels. The training further transforms the document representation based on features using a residual layer. The training then generates per-label document representations with label attention to a varying range of neighboring nodes of a node associated with the document in the joint graph.

As discussed in more detail below, the present disclosure relates to an XC processing system for predicting recommended labels for a given document based on an extremely large set (e.g., millions) of labels. The XC system according to the present technology receives a document and provides one or more recommended labels based on millions of candidate labels. In particular, the XC processing system uses a joint graph including documents and labels with feature transformation on residual levels and label attention to generate per-label document representations and further generate trained per-label classifiers. The present technology addresses the problem of providing high-performance and highly-accurate XC by including features of documents and candidate labels in neighborhoods of a document node within the joint graph in order to generate document representations.

FIG. 1 illustrates an overview of an example system 100 for generating and using labels and classifiers based on documents in accordance with aspects of the present disclosure. System 100 represents a system for using graph convolution and feature transformation with label attention to generate trained classifiers for candidate labels in extreme classification (XC) processing. System 100 includes a client device 102, an application server 110, an extreme classification server 120, a classifier generator 140, a network 130, and a data sever 160. The client device 102 communicates with the application server 110, which includes one or more sets of instructions to execute as applications on the client device 102. The application server 110 includes a data retriever 112 and a data viewer 114. The one or more sets of instructions in the application server 110 may provide an interactive user interface through an interactive browser 104. The extreme classification server 120 includes a query receiver 122, a document classifier 124, a class storage 126, an answer provider 128, and an activity log 130. The network 130 provides network connectivity among the client device 102, the application server 110, and the extreme classification server 120, and the data server 160. The classifier generator 140 includes training database 142, a joint graph database 144, a graph convolution generator 146, a feature transformer 148, a label attention generator 150, and a classifier learner 152. The Data Server 160 stores and serves data to the extreme classification server 120 and the application server 110 over the network 130.

The client device 102 connects with the application server 110 via the network 130 to execute applications that include user interactions through the interactive browser 104. The application server 110 interacts with the client device 102 and the extreme classification server 120 via the network 130 to perform various application services (e.g., a web search, a sponsored search, a product recommendation, a movie recommendation, etc.). The classifier generator 140 generates a set of classifiers during a training process. A classifier classifies a given document into one or more recommended labels. In aspects, there is at least one classifier for each label. The classifier generator 140 generates a set of classifiers based on a joint graph. The joint graph includes documents and labels for training. The classifier generator 140 deploys generated classifiers to the extreme classification server 120 for production use.

The client device 102 is a general computer device providing user-input capabilities e.g., via interactive browser 104 for searching for information over the network 130. In some aspects, the client device 102 optionally receives user input from a system developer for fine tuning various parameters for training the XC processing. The various parameters for tuning may include, for example, parameters used in the network for a feature transformation of document representations and adjusting weights in label attention for per-label document representations as detailed below.

The application server 110 is a server that enables a user (who may search for information based on a deployed trained model) and a developer (who may use the classifier generator 140 during a training process to generate the classifiers for deployment) to interactively use the system 100 on the client device 102. The application server 110 may comprise applications including the data retriever 112 and the data viewer 114. The data viewer 114 may provide a rendering of data for viewing by the user. The data retriever 114 may be used to query and receive data by communicating with the extreme classification server 120, for example.

In aspects, the data retriever 112 may connect with the document receiver 122 of the extreme classification server 120 to query information. The extreme classification server 120 operates as a predicting process of the XC processing system. For example, the application for retrieving data may include but is not limited to a web search that provides one or more recommended websites as recommended labels based on a query input (also referred to as a "document"). In aspects there may be millions of websites from which recommendations may be selected. Other examples may include a sponsored website that provides one or more web advertisements (i.e., directed content) as recommended labels along with search results in response to a given query as a document. There may be millions of web ads. Product recommendations provide one or more products as recommended labels in response to a given product query as a document. Movie recommendations provide one or more movie titles as recommended labels in response to a given movie title query as a document.

The document classifier 124 may classify a given document into one or more recommend labels using a set of pre-trained classifiers. In aspects, there may be a classifier for each class or label. In aspects, the document classifier 124 annotates the one or more recommended labels to the document. A class storage 124 stores a set of candidate classes or labels. In XC processing, there may be over a million candidate labels from which the document classifier 124 may select for a given document. An answer provider 128 provides a set of recommended labels as an answer to the given document. An activity log 130 stores logs of activities of receiving a document and providing recommended labels associated with the document. In aspects, the classifier generator 140 may use content of the activity log 130 as the basis of a joint graph database 144 for training the classifiers.

The classifier generator 140 represents an application/system used for generating a set of classifiers during the training process of the XC processing. The generated set of classifiers may be used for deployment in the extreme classification server 120. In embodiments, the classifier generator 140 includes training database 142, a joint graph database 144, a graph convolution generator 146, a feature transformer 148, a label attention generator 150, and a classifier learner 152. In aspects, the classifier generator 140 receives the input feature for a document and output the probabilities of each label belonging to the document.

The training database 142 stores training data for generating a joint graph, which is used for training classifiers. In aspects, the training data may be based on the activity log 130 that associates given queries to a set of recommended labels responsive to the respective given queries. Thus, the training data includes documents and associated labels. In a web search application, the training data may include a web search activity history, which refers to web search queries and resulting sets of recommended websites (web addresses) responsive to the respective web search queries. In a sponsored search application, the training data may include web queries and sets of web recommended advertisements or directed content responsive to the respective web queries. In a product recommendation application, the training data may include given product information and sets of recommended products responsive to the given product information. In a movie recommendation application, the training data may include given movie information and recommended sets of movies responsive to the given movie information.

The joint graph database 144 includes one or more joint graphs for training the classifiers. A joint graph includes nodes and edges. A node represents either a document as a document type or a label as a label type. An edge connects two nodes as a directed link (or relationship) from one node to another. For example, one node may represent a document; an edge may originate from the document node to another node that is a recommended label associated with the document. For example, a document node may represent a given query in a web search. An edge connects the document node to a label node that represents one of a set of recommended websites responsive to the given query in the web search. In some aspects, nodes for documents and labels may alternate within the joint graph. In some other aspects, there is no restriction on a sequence of node types, e.g., from a document node to a label node, from a document node to another document node (e.g., traversing websites), from a label node to another label node, or from a label node to another document node. In aspects, the joint graph includes a tree structure. In other aspects, the joint graph includes a mesh or a web structure.

A graph convolution generator 146 performs a graph convolution using the joint graph database 144 to generate a multi-dimensional vector representation of a document (hereinafter a document representation). The graph convolution generator 146 generates the document representation by vectorising neighborhood features and contextual information available from neighboring nodes associated with the document. Neighboring nodes are associated with a neighborhood level depending on a degree of separation from the document node. For instance, a first level neighborhood (e.g., "first hop") includes first nodes in a direct relationship or connection with the document node, a second level neighborhood (e.g., "second hop") includes the first nodes as well as second nodes (which are in a direct relationship with the first nodes), a third level neighborhood (e.g., "third hop") includes the first nodes, second nodes, and third nodes (which are in a direct relationship with the second nodes).

The graph convolution generator 146 retrieves features and/or context information associated with neighboring nodes in different neighborhood levels from the document node for use in generating the document representation. In aspects, an extent of the neighboring nodes used for a particular document representation is based on a number of hops (or neighborhood levels) from the document node. Each neighborhood level may be weighted differently and, to accommodate these various weights for training classifiers, the graph convolution generator 146 may generate a set of document representations for a document. Each document representation may be based on a unique extent of neighboring nodes (or, neighborhood level) based on a number of "hop(s)." For example, the graph convolution generator 146 may generate a set of three document representations for the document, a first based on one hop, a second based on two hops, and a third based on three hops. In aspects, graph convolution can also learn existing transitive relationships, which can lead to better generalization on unseen documents. Other benefits of implementing graph convolutions in this way includes its flexibility to accommodate additional sources of information such as revealed items in a warm start setting. These additional sources of information may serve as important links and allow adding more details to the final node embedding.

A feature transformer 148 transforms the set of document representations from the graph convolution into a set of document representations based on residual layers of residual neural networks used for deep learning. In aspects, the residual neural network includes a skip connection for the input document representation to be combined with output of the residual network to generate the final output. Thus, a document representation from graph convolution is multiplied by the weights of the residual layer and then added to bias terms. The residual layer includes a feedforward network, a normalization processing, the rectified linear unit (ReLU), and a skip connection. The skip connection enables retaining the document representation during the feature transformation. In aspects, the feature transformer 148 generates a set of document representation, each corresponding to the feature transformation of a respective document representation from the graph convolution associated with a number of hop(s). For example, the feature transformer 148 generates a set of three transformed document representations for each of the first, second, and third hops described above.

A label attention generator 150 generates a set of per-label (or label-specific) document representations. A per-label document representation is a multi-dimensional vector representation of a document with respect to a particular candidate label. Accordingly, a number of per-label document representations in the set is the same as a number of candidate labels. In this way, extreme classification processing enables annotating documents with candidate labels from over a million labels.

In aspects, the head labels and the tail labels correspond to different views of the joint graph based on a number of neighboring labels connected to respective labels. Head labels connect with more neighboring labels than tail labels in the graph. Accordingly, including neighboring labels in one hop from the head label results in more labels than in one hop from the tail label. A candidate label that is a tail label may require labels from a large extent of neighbors (i.e., more hops) to include information that is sufficient to accurately classify a document into the candidate label. Including contextual information of more neighboring nodes enriches the per-label document representations. In contrast, a candidate label that is a head label may require less hops (e.g., one hop) to attain information that is sufficient to accurately classify. Based on the label attention, the label attention generator 150 may learn different attention weights for each label and hop.

In aspects, the weights may be normalized using a softmax operation before applying weighting to respective per-label document representations. The label attention generator 150 generates the per-label document representations by aggregating weighted, feature-transformed vector representations of the document for each hop. Accordingly, the per-label document representations include expressive power that is sufficient regardless of whether the label is a head label or a tail label in the graph.

The classifier learner 152 learns a set of classifiers, each classifier corresponding to a single label. The classifier learner 152 uses training database 142 jointly with the per-label document representations to learn the classifiers for respective labels. In aspects, the classifier learner 152 performs the learning (or the training) process in a series of batches to improve efficiency of learning millions of classifiers, each corresponding to a candidate label. The batch process reduces the training cost by randomly sampling negative labels that serve as negatives for all the documents in the batch. For example, a batch may include 256 classifiers, but is not limited to 256 classifiers. The batch process improves the training performance from calculating values of multi-dimensional vectors with the attended label and the classifier for each of millions of labels.

During the prediction process, there may be two scenarios: the cold start and the warm start. In the cold start, given documents are not a part of the joint graph used during the training process of the XC processing system. In aspects, new documents as recommended labels responsive to a given document may be introduced using an Approximate Nearest Neighbor Search (ANNS) over existing nodes in the joint graph. The ANNS includes retrieving a select number of closest nodes for each of the given documents and inserted them into the joint graph. Additionally or alternatively, one or more prediction points may be introduced in the joint graph by using auxiliary signals. For example, the joint graph may include information about correlation between queries by a user based on a query history as auxiliary signals in the joint graph. In aspects, a short listing of the most probable labels for a given document may be performed by using the ANNS over the graph label embeddings or over the document representations based on graph convolutions.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
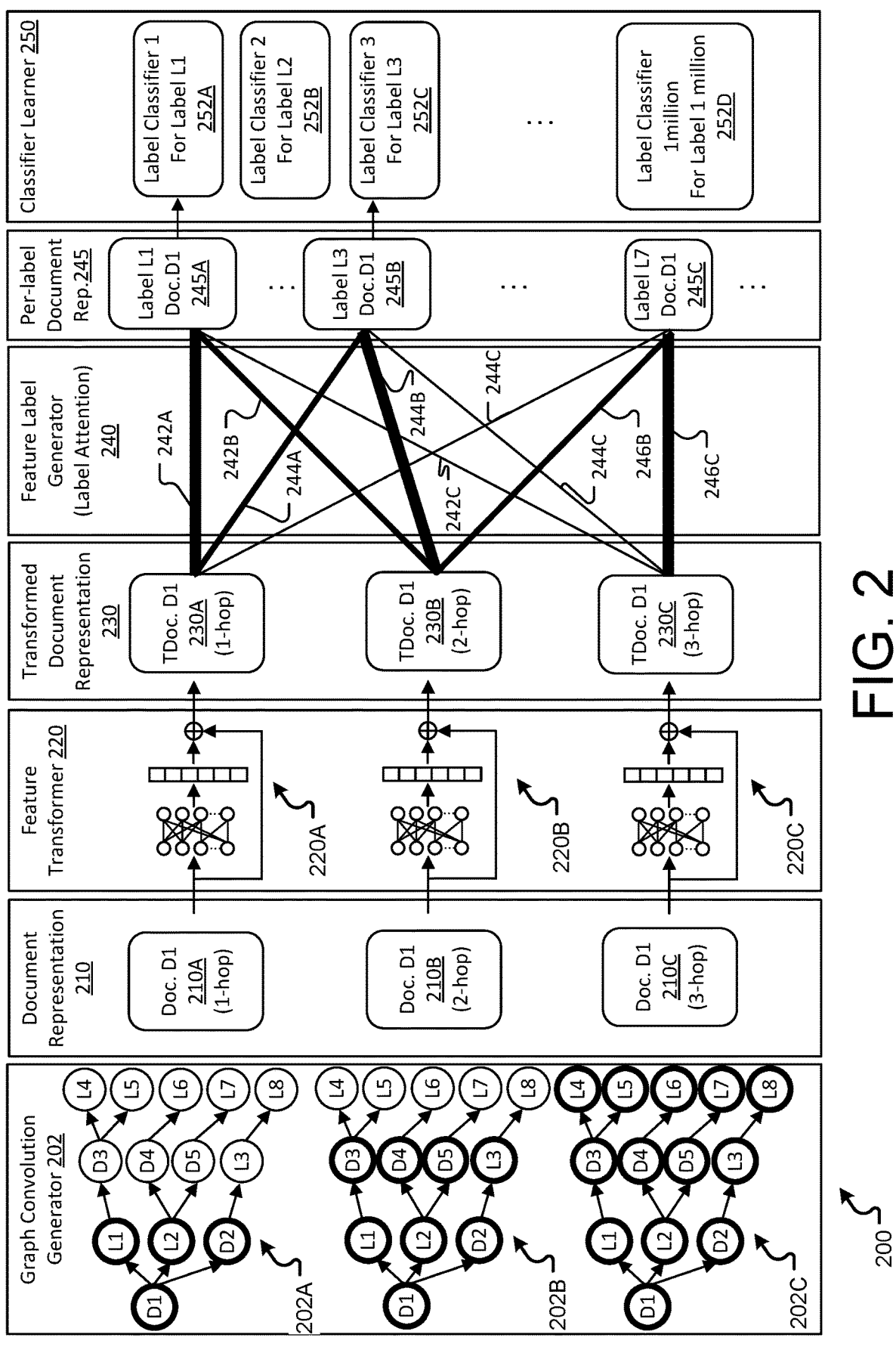
FIG. 2 illustrates an example of system architectures in accordance with aspects of the present disclosure.

FIG. 2 illustrates an example of the system architecture according to aspects of the present disclosure. The system 200 illustrates a progression of XC processing for a document, D1, including processing by a graph convolution generator 202, a feature transformer 220, a feature label generator (label attention) 240, and a classifier learner 250. In particular, the system 220 includes processing three different neighborhood levels (i.e., one hop, two hops, and three hops) for generating multi-dimensional vector representations of the document, D1.

The graph convolution generator 202 processes a joint graph based on three different levels (e.g., hops) of highlighted nodes (e.g., nodes highlighted by bolded outlining).

Each of the three levels are processed for a document node that represents the document, D1. For example, in a first hop of the joint graph, D1 connects to a recommended label L1, a recommended label L2, and a document D2. In a second hop of the joint graph, L1 connects to D3, L2 connects to D4 and D5, and D2 connects to L3. In a third hop of the joint graph, D3 connects to L4 and L5, D4 connects to L6, D5 connects to L7, and L3 connects to L8. In aspects, the joint graph may be generated from an activity log of a web search application, for example. The activity log may include a log entry of traversing from a webpage D1 to another webpage D2. Another log entry may indicate receiving the webpage D1 as an input query to web search, resulting in providing a recommended website as the recommended label L1 and another recommended website as the recommended label L2 in response, and so on.

The joint graph 202A illustrates use of immediate (e.g., directly related) documents and labels (i.e., one hop from D1) to generate a multi-dimensional vector representation of the document D1 as Doc.D1 210A (1-hop). The joint graph 202B illustrates use of the immediate plus one additional hop of documents and labels (i.e., up to two hops from D1) to generate a multi-dimensional vector representation of the document D1 as Doc.D1 201B (2-hop). The joint graph 202C illustrates use of the immediate plus two additional hops of documents and labels (i.e., up to three hops from D1) to generate a multi-dimensional vector representation of the document D1 as Doc.D1 210C (3-hop). Document representations 210 includes the three multi-dimensional vector representations of the document (i.e., the document representations based on the first, second, and third hops).

The feature transformer 220 transforms the document representations 210 from the graph convolution into feature-transformed document representations 230. In particular, the feature transformer 220 uses residual layers of the residual networks 220A-C. In aspects, the residual neural networks 220A-C include a skip connection for the document representation that is combined with output of the residual layer(s) to generate the final output. Accordingly, each document representation from the graph convolution is multiplied by the weight output of the residual layer and then added to the document representation. In this way, the residual network 220A transforms Doc.D1 210A (1-hop) into TDoc.D1 230A (1-hop); the residual network 220B transforms Doc.D1 210B (2-hop) into TDoc.D1 230B (2-hop); and the residual network 220C transforms Doc.D1 210C (3-hop) into TDoc.D1 230C (3-hop).

The feature label generator (label attention) 240 generates a set of per-label document representations based on label attention. In aspects, a number of per-label document representations corresponds to a number of candidate labels. In FIG. 2, Label L1-Doc.D1 245A represents a document representation with respect to the label L1. For the Label L1-Doc.D1 245A, a line 242A that connects TDoc.D1 230A (1-hop) to Label L1-Doc.01 245A is thicker than a line 242B that connects TDoc.D1 230B (2-hop) to Label L1-Doc.D1 245A, and is also thicker than a line 242C that connects TDoc.D1 230C (3-hop) to Label L1-Doc.D1 245A. The joint graph 202A indicates that the label L1 is in a first level neighborhood based on one hop from D1.

Accordingly, in the example, the label attention (represented by line 242A) used to generate the per-label document representation from TDoc.D1 230A (1-hop) carries the most weight in the per-label document representation for label L1 (i.e., Label L1-Doc.D1 245A) Similarly, as illustrated by the relative thickness of line 244B, TDoc.D1 230B (2-hop) carries the highest weight in generating the Label L3-Doc.D1 245B. Moreover, as illustrated by the relative thickness of line 246C, TDoc.D1 230C (3-hop) carries the most weight in generating the Label L7-Doc.D1 245C. In this way, based on label attention, a per-label document representation may be generated for a particular label by varying the weighting of different feature-transformed document representations (which are each based on a different number of hops from the document). In aspects the varied weight for a label attention may be determined based at least on a position of a candidate label (e.g., a head label or a tail label) in a joint graph. In some other aspects, the varied weight for the label attention may be determined based on an exclusive graph of candidate labels.

The classifier learner 250 trains a classifier for labels. The classifier for a label is trained based on joint learning from the training data and the per-label document Representation for the label. Training the Label Classifier 1 for Label L1 252A, for example, uses the per-label document representation Label L1 Doc.D1 245A. The joint learning enables the classifier learner 250 to learn label classifiers with discriminating features for respective labels based on a number of hops from the document in the joint graph. In aspects, the classifier learner 250 trains a subset of the label classifiers. The classifier learner 250 may select a subset of the label classifier to evaluate. In some other aspects, the weights of those label classifiers in the subset may be updated. The prediction process may use ANNS to shortlist select label classifiers for evaluation.

Additionally or alternatively, the present technology may select a subset of the label classifiers for evaluation using various technologies other than those described above, (e.g., the combination of the graph convolution and feature generation using label attention). For example, generating multi-dimensional vector representations of documents may use inductive representation learning on the joint graph (e.g., by using some inductive framework that uses node feature information of a graph to generate node embedding for data). For example, the inductive representation learning may include sampling and aggregating features of documents and candidate labels for generating multi-vector representations. In some aspects, the inductive representation learning may be combined with near neighbor algorithms other than ANNS (e.g., in-memory implementations of ANNS and use of hierarchical navigable small world graphs) for retrieving nearest neighbor nodes of a given node.

Additionally or alternatively, use of graph attention networks may be used rather than the graph convolution and the neighborhood label attention based on hops in the joint graph. In aspects, use of the graph attention network includes specifying distinct weights to nodes in the neighborhood of a node in the joint graph for generating multi-dimensional vector representations of the document.

FIG. 3 illustrates an example of data structures according to aspects of the present disclosure. The example 300 illustrates an exemplar activity log from a web search application. A web search activity log 302 may be a table that includes the activities and results, where each activity and each result may correspond to a node. The graph 308 is a joint graph of activity nodes and result nodes based on the web search activity log 302.

As illustrated, the web search activity log 302 includes two columns. Activities 304 may correspond to input on originating web queries or webpages for a query or traversing, and Results 306 may correspond to resulting or destination webpages. In aspects, the activities 304 may also include a web traverse from a webpage to another webpage to capture a relationship between webpages as documents. In aspects, activities 304 in the left column of the table illustrate web search queries received from the user or originating webpages from which the user traversed. The website traversal may be tracked using various tracking tools including cookies, for example. Results 306 on the right column in the table include webpages responsive to a given search query or a web traversing operation. The right column also includes destination webpages to which the user traverses when following a link from originating webpages. Inside each parenthesis an identifier is provided with each query or webpage. For example, D1 (310) is an identifier for a document and L1 is an identifier for a recommended label. An edge 312 connects from D1 to L1. In aspects, an operation of traversing or following a link from a webpage to another webpage results in a document on the left column and another document n the right column. In some other aspects, an operation of traversing from a result page of web query to another result page of web query may cause the left column having a recommended label and the right column having another recommended label.

In some aspects, activities 304 may include only documents on the left column and only labels on the right column. For example, some systems may record activities of receiving a query (i.e., a document) and a resulting webpage (e.g., a recommended label). When a user selects a webpage that is a result (i.e., a recommended label) of a previous web search and searches for a relevant webpage to reach another website, the webpage and the other webpages are indicated both labels.

The present technology includes generating a joint graph based on an activity log. For example, the Activities 304 and Results 306 may correspond to nodes of the joint graph. For example, a search query "What is a banana?" on a query (D1) as a document resulting in a recommended webpage "Fruit Directory (L1)" as a label. Accordingly there is a relationship between D1 and L1. The task of a web search based on D1 annotates D1 with L1 as an associated label by connecting document node D1 with label node L1. Similarly, the web search based on D1 as the query resulted in another recommended webpage "Banana World" (L2) as a search result. The classification task also annotates D1 with L2. The activity log also includes an activity where the user selected "Jump to a search-by-image page" on the query page, resulting in a webpage traversal to the Image Search Page (D2). Accordingly, D1 is associated with D2.

The training process of XC processing may include generating a joint graph (e.g., the joint graph 308) based on an activity log. The joint graph 308 indicates that the node D1 connects to a recommended label L1, a recommended label L2, and a document D2. L1 connects to D3. L2 connects to documents D4 and D5 respectively. D2 connects to D2. D3 connects to recommended labels L4 and L5. D4 connects to a recommended label L6. D5 connects to a link L7. And, the link L3 connects to L8. The joint graph 308 is an example based on a tree graph structure. In some other aspects, a joint graph may be in a mesh or a web form, depending on relationships among documents and recommended labels in activity logs.

In aspects, the present technology uses a number of hops in a joint graph in determining an extent of neighboring nodes to consider for a given document or a recommended label. For example, in the joint graph 308, the recommended label L1 is one hop from D1. The recommended label L2 and the document D3 are also one hop from D1. Documents D3, D4, D5, and the recommended label L3 are two hops from D1. The recommended labels L4, L5, L6, L7, and L8 are three hops from D1. The graph convolution generator (e.g., the graph convolution generator 146 in FIG. 1) uses the joint graph 408 to generate a set of multi-dimensional vector representations of the document D1 (e.g., a document representation for D1). Each multi-dimensional vector representation of the document may use a distinct number of hops (e.g., one hop, two hops, and three hops) to accommodate information of other documents and recommended labels in the multi-dimensional vector representation.

FIG. 4 illustrates an example of data structure according to aspects of the present disclosure. The example 400 illustrates an exemplar activity log from a sponsored search application on how web ads (i.e., directed content) are associated with queries and webpages. In aspects, sponsored search activity log 402 is a table that includes activities and results. The graph 408 is a joint graph based on the sponsored search activity log 402.

The sponsored search activity log 402 includes two columns. Activities 404 may correspond to input on originating web queries or webpages for a query or traversing, and Results 406 may correspond to resulting or destination webpages. In aspects, the activities 404 may also include a web traverse from a webpage to another webpage to capture a relationship between webpages as documents. In aspects, activities 404 in the left column of the table illustrate web search queries received from the user or originating webpages from which the user traversed. The website traversal may be tracked using various tracking tools including cookies, for example. Results 406 on the right column in the table include directed content (web ads) responsive to a given search query or a web traversing operation. The right column also includes destination webpages to which the user traverses when following a link from originating webpages. Inside each parenthesis an identifier is provided with each query or webpage. For example, D1 is an identifier for a document and L1 is an identifier for a label. In aspects, an operation of traversing or following a link from a webpage to another webpage results in a document on the left column and another document n the right column. In some other aspects, an operation of traversing from a result page of web query to another result page of web query may cause the left column having a label and the right column having another label.

The present technology includes generating a joint graph based on an activity log. For example, the activities 404 and results 406 may correspond to nodes of the joint graph. For example, a search query "What is a banana? on a query page (D1) as a document resulted in directed content or a web ad for a fruit shot "Fresh Fruit Mart—Banana Special! (L1)." The directed content is a recommended label for the received query as a document.

Accordingly there is a relationship between D1 and L1. The task of a sponsored search based on D1 annotates D1 with L1 by connecting document node D1 with label node L1 Similarly, the classification task annotates D1 with L2. The web search based on D1 as a query resulted in another directed content, a web ad for a vitamin store: "Vitamin Supplement Store—Vitamin C (L2)." The activity log also includes an activity where the user selected "Jump to a search-by-image page" on the query page D1, resulting in a webpage traversal to another query page "Image Search Top Page (D2). Accordingly, D1 is associated with D2.

The training process of XC processing may include generating a joint graph (e.g., the joint graph 408) based on an activity log. The joint graph 408 indicates that the node D1 connects to a recommended label L1, a recommended label L2, and a document D2. L1 connects to D3. D3 connects to recommended labels L4 and L5. L2 connects to documents D4 and D5. D4 connects to a recommended label L6. D5 connects to a link L7. D2 connects to a link L3. And, the link L3 connects to L8.

Figure 5:
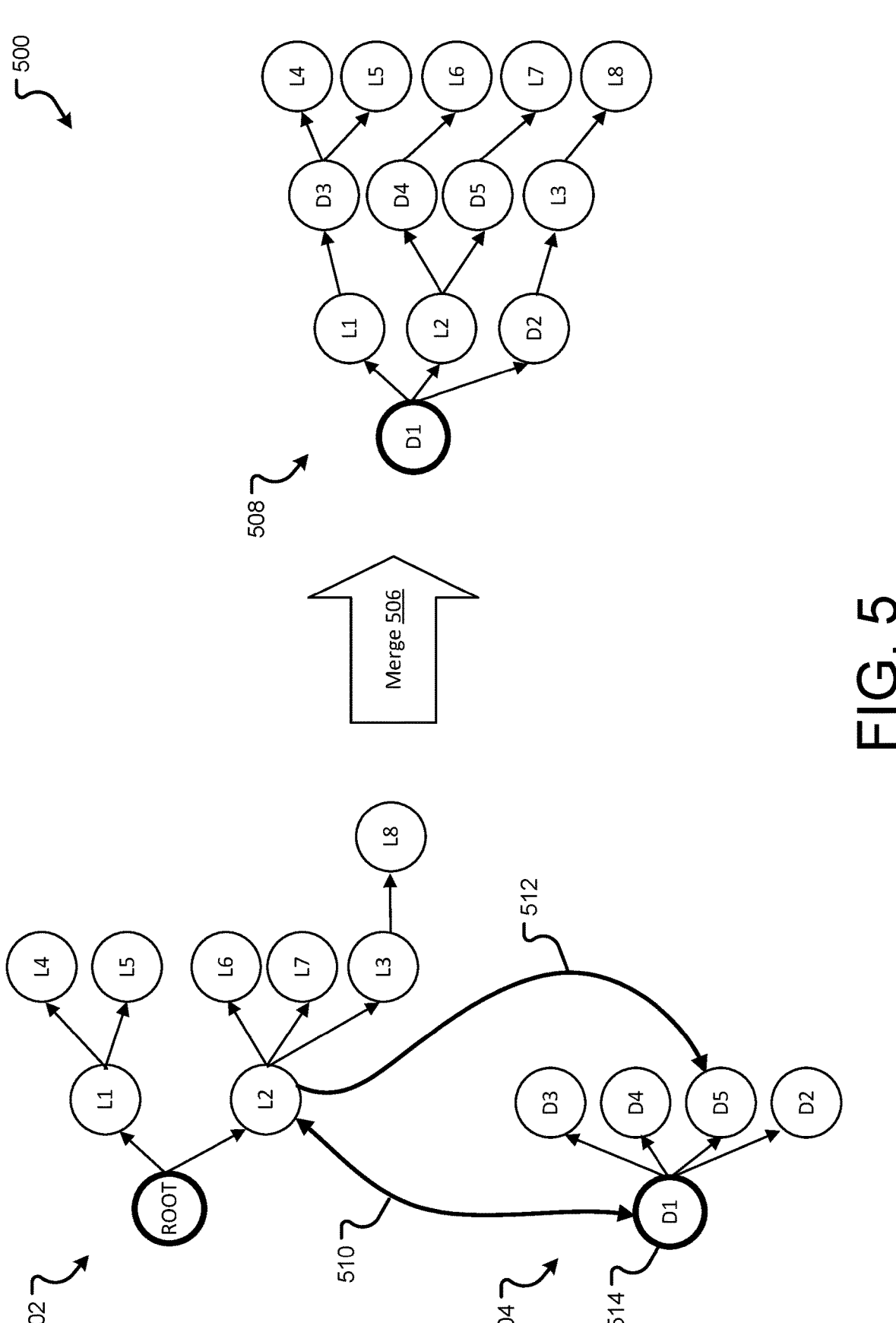
FIG. 5 illustrates an example of data structures for generating a joint graph in accordance with aspects of the present disclosure.

FIG. 5 illustrates an example data structure for generating a joint graph according to the present disclosure. In particular, the example 500 illustrates an example of joining two distinct graphs. A label (or class) graph 502 includes labels as nodes, linked from a root label node. The candidate label graph 502 depicts relationships among labels. For example, the label graph 502 may illustrate relationships among directed content. A document graph 504 includes documents as nodes, linked from a document (e.g., D1). For example, the document graph 502 may depict relationships among webpages in a web search or sponsored search application. The arrow "Merge 506" points to a joint graph 508, where the process of merging the label graph 502 and the document 504 generates the joint graph 508 based on the document D1.

In the label graph 502, the Root node connects to candidate labels L1 and L2. The label L1 connects to the candidate labels L4 and L5. The label L2 connects to the labels L3, L6, and L7. The label L3 connects to the label L8. Edges in the label graph 502 illustrate relationships among labels as nodes. For example, the labels L1 and L2 are head labels. The labels L4, L5, L6, L7, and L8 are tail labels because the tail labels do not have outbound edges to another label. In aspects, the head labels are more "data-rich" or context rich than the tail labels in the label graph. For example, L8 may be a sub-label of the L3, which is a sub-label of L2.

In the document graph 504, the document D1 (514) connects to documents D2, D3, D4, D5, and D6. Edges in the document graph 504 illustrate relationships among the documents as nodes. The relationships may be based on but not limited to a semantic relationship, based on content of respective documents, a bibliographical relationship, a temporal relationship, and others.

Edges 510 and 512 illustrate edges that connect nodes in the label graph 502 and the document graph 512. The edge 510 connects the document D1 in the document graph 504 to a candidate label L2 in the label graph 502 based on a relationship between the document D1 and the candidate label L2. For example, a previous task of classification may have annotated the document D1 with the label L2 as a recommended label. The edge 512 connects the candidate label L2 in the candidate label graph 502 to the document D5 in the document graph 504. For example, a web advertisement L2 may be associated with a webpage D5 in a sponsored search application. The edges 510 and 512 may be a part of a set of other edges that connect between the two graphs. In some aspects, one or more edges may be bidirectional.

Merge 506 indicates merging the label graph 502 and the document graph 504 to generate an joint graph 508 of the two independent graphs. In the joint table 508, the document D1 is the head node and connects to the candidate label L1, the candidate label L2, and the document D3, for example. The exemplar joint table 508 includes the candidate labels and the documents from the two distinct graphs while retaining relationships among the candidate labels and the documents. The present technology uses the joint graph for generating document representations to train classifiers for candidate labels.

Figure 6:
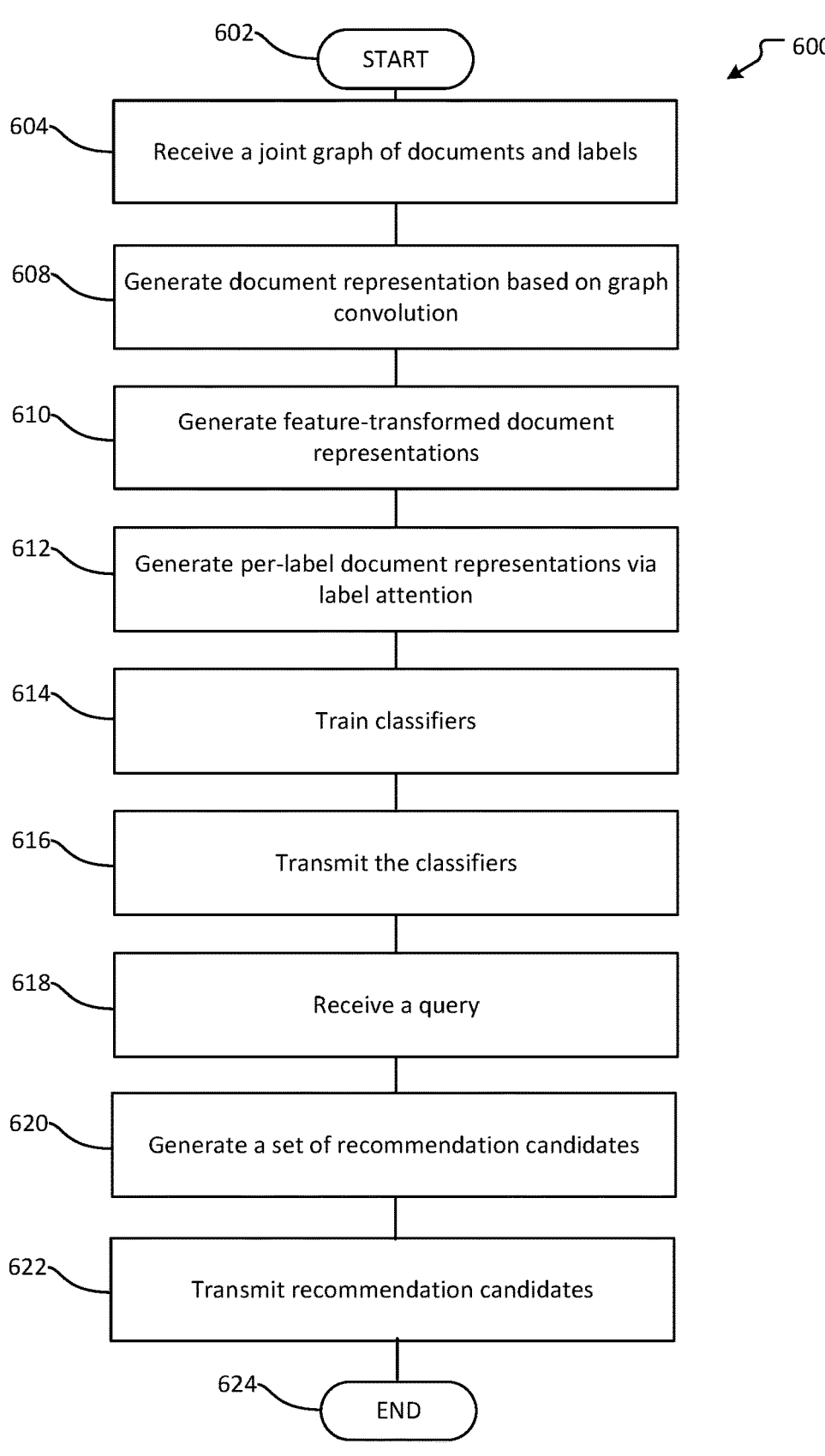
FIG. 6 illustrates an example of a method for training classifiers and predicting labels in accordance with aspects of the present disclosure.

FIG. 6 is an example of a method for training classifiers for candidate labels in XC processing in accordance with aspects of the present disclosure. A general order of the operations for the method 600 is shown in FIG. 6. Generally, the method 600 begins with start operation 602 and ends with end operation 624. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4, 5, 7, and 8A-B.

Following start operation 602, the method 600 begins with receive operation 604, which receives a joint graph of documents and candidate labels. The joint graph may be based on activity logs of applications including but not limited to a web search, a sponsored search for providing web advertisements or directed content, product recommendations, movie recommendations, and the like. In aspects, the joint graph may be generated based on a combination of a graph that indicate relationships among documents and another graph that illustrates relationships among candidate labels.

Generate operation 608 generates document representations based on graph convolution of the joint graph. A document representation is a multi-dimensional vector representation of a document. In aspects, generating the document representation according to the present technology does not require vectorising words or content from the document. Rather, the document representation may include attributes of the document. In aspects, the generate operation 610 generates a set of document representations of a document by graph convolution based on varying extents of neighboring nodes (e.g., a number of hops from the document node). For example, one document representation may be generated based on graph convolution using one-hop. Another document representation may be generated based on graph convolution using two hops. Yet another document representation is based on three hops.

Generate operation 610 generates feature-transformed document representations. The generation operation 610 takes the set of document representations based on graph convolution as input. Then, the generate operation 610 performs feature transformation of a document representation using a residual layer (e.g., a neural network) with a skip connection of the document representation. The generate operation 610 results in a set of feature-transformed document representations for each of a respective level (or hop) of neighbor nodes in the joint graph.

Generate operation 612 generates per-label document representations based on label attention. The label attention determines different weights for attending each document representation, which is based on a particular extent (i.e., hops) of neighbor nodes in the joint graph. For example, a candidate label that is two hops from the document causes label attention to the feature-transformed document representation based on two hops. In this way, information about documents or candidate labels in subsequent layers (or hops) up to two hops from the document node are accommodated in the vector expression. Thus, a different amount of information is taken into account in generating the per-label document representation based on a position of the candidate label in the joint graph. A head label in the graph attends to fewer hops than a tail label, for example. The head label inherently is data rich because of outgoing edges from the head label. In contrast, the tail label has less information because of being at an end of the graph.

Learn operation 614 learns classifiers. In aspects, there is one classifier for each candidate label. The learning process may be a joint learning based on training data and the per-label document representation. By accommodating the per-label document representation for training the label classifier, the learning operation 614 enables learning the respective classifiers to be more discriminating from one another.

In aspects, the training process of the XC processing according to the present technology has advantages in performance over some traditional systems. Unlike some traditional systems that use individual words or content from documents to learn classifiers for candidate labels, the present technology learns classifiers based on a joint graph (including both documents and candidate labels) and not from analyzing the text or content of a document. The amount of data processed for training millions of candidate labels based on document representations from the joint graph may be less than the data volume required to analyze content for each documents. The training process based on the joint graph provides a better scalability to train an extremely large number of candidate labels (i.e., millions of candidate labels) than a training process based on multiple, distinct graphs.

Deploy operation 616 deploys the trained classifiers for a prediction process of the XC processing system. In aspects, the set of classifiers may be installed in the extreme classification server. There may be one classifier for each candidate label.

Receive operation 618 receives a query as a document in the prediction process for XC processing. The document may be in different forms for different applications. For example, the document may represent a web search query or a webpage in a web search application or a sponsored search application. Additionally or alternatively, the document may represent a product identifier or product information in product recommendation applications. Further still, the document may be a movie title in a movie recommendation application. The common purpose of receiving the document is for the XC processing to determine one or more labels as the most relevant recommendations in response to the received document based on millions of candidate labels.

Generate operation 620 uses the trained classifiers to generate a set of recommended labels from the millions of candidate labels. In the case of a cold start, where the received document is not in the joint graph used for training the classifiers, the generate operation 620 may identify a set of documents by using ANNS over existing nodes in the joint graph. To process evaluation of the trained classifiers efficiently, the generation operation 620 may use the ANNS over the document representations based on graph convolution and recall the top predictions of recommended labels for the given document. In aspects, the document representations based on the graph convolution may be an averaged multi-dimensional vector representations of the document representations across multiple extents of neighboring nodes (e.g., one hop, two hops, and three hops).

In aspects, the generate operation 620 may further determine a set of recommended labels that are the most probable for a given document by performing an Approximate Nearest Neighbor Search (ANNS) over set of recommendation candidates (e.g., candidate labels). The ANNS may be performed by generating multi-dimensional vector representations of candidate labels with graph convolution (i.e., the residual layer). That is, the ANNS uses the multi-dimensional vector representation of the candidate labels to recall top predictions of the recommended labels through short-listing probable labels. This way, the prediction process does not require use of all the millions of classifiers to annotate the given document with recommended labels. The technique of short listing of select classes is effective in improving performance especially in the cold start situation where the given document is not in the joint tree used for training the classifiers.

In aspects, the generate operation 620 generates the set of top predicted recommendations for labels based on the classifiers that are jointly trained from training data and the per-label document representations from the joint graph, without requiring analyses of word-by-word content of documents and candidate labels to determine recommended labels. The prediction process without the word-by-word analysis of content but with relationships between documents and candidate labels makes the prediction process scalable without significant losses in performance.

Transmit operation 622 transmits a result of the prediction process of the XC processing in response to the received document. The transmit operation 622 may transmit the result to the client device for viewing. The result of the prediction process may be one or more recommended labels. The one or more recommended labels may take distinct forms depending on applications. For example, a result of a web search may be a set of websites responsive to a received web search. A result of a sponsored search may include one or more web advertisements or directed content in response to a web search query. A result of a product recommendation query or a given product may include a set of products (each corresponding to a recommended label) that are relevant to the product recommendation query or a given product. A result of movie recommendation may include a set of movie titles that are relevant to a given movie query or a movie title. In aspects, method 600 may end with end operation 624.

As should be appreciated, operations 602-624 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
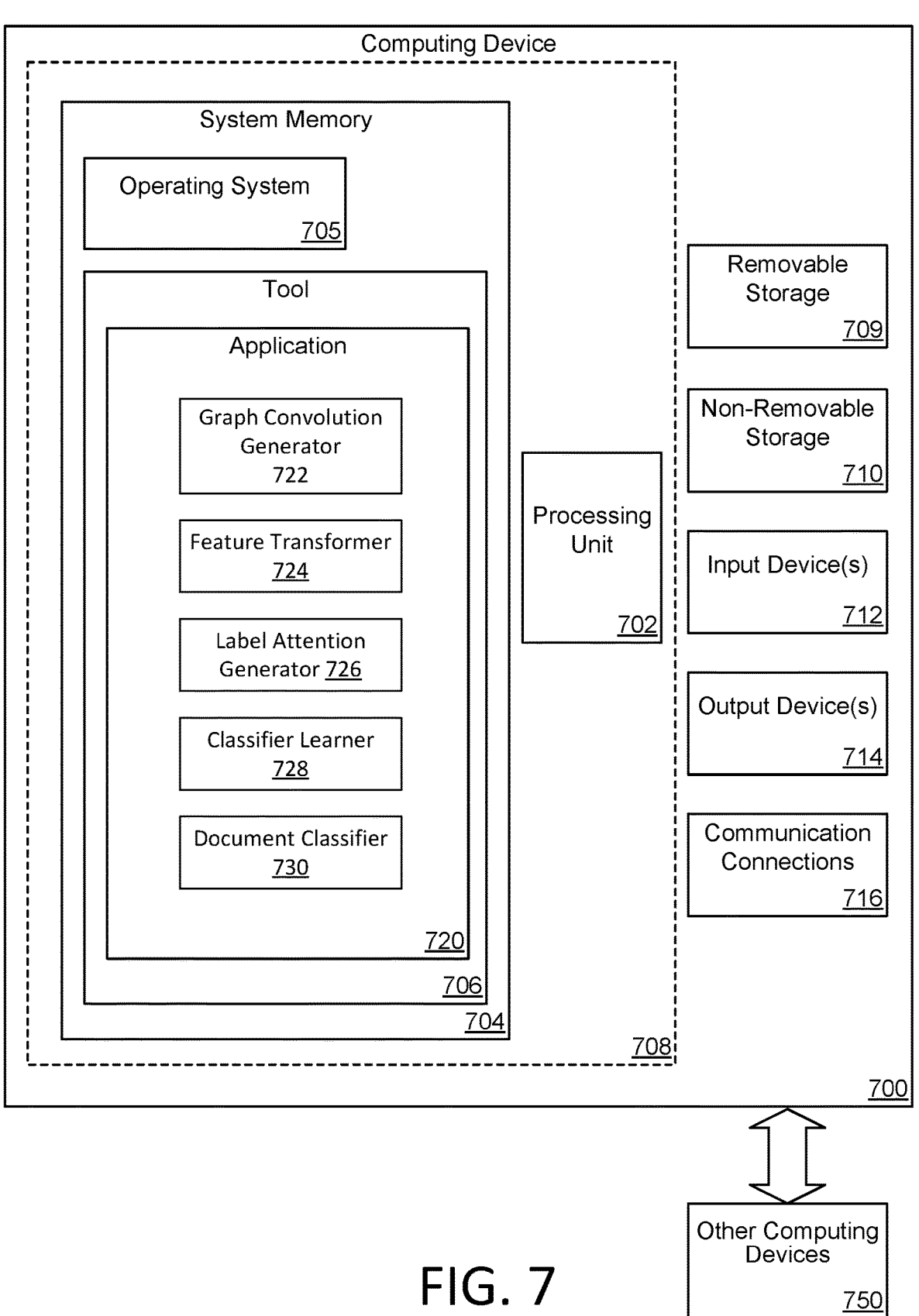
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device

700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a graph convolution generator 722, a feature transformer 724, a label attention generator 726, a classifier learner 728, and a document classifier 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
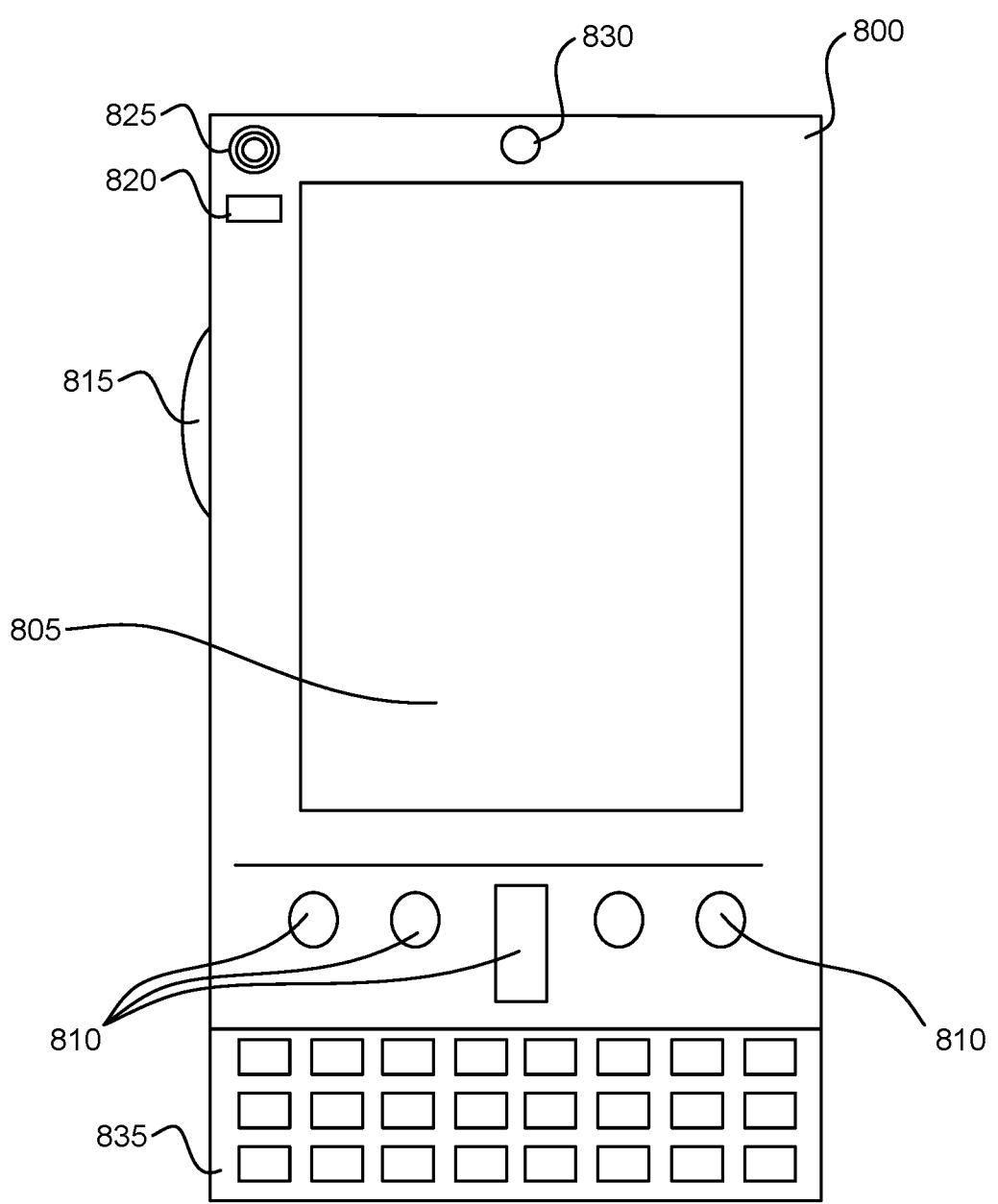
FIG. 8A is a simplified diagram of a mobile computing device with which aspects of the present disclosure may be practiced.
Figure 8B:
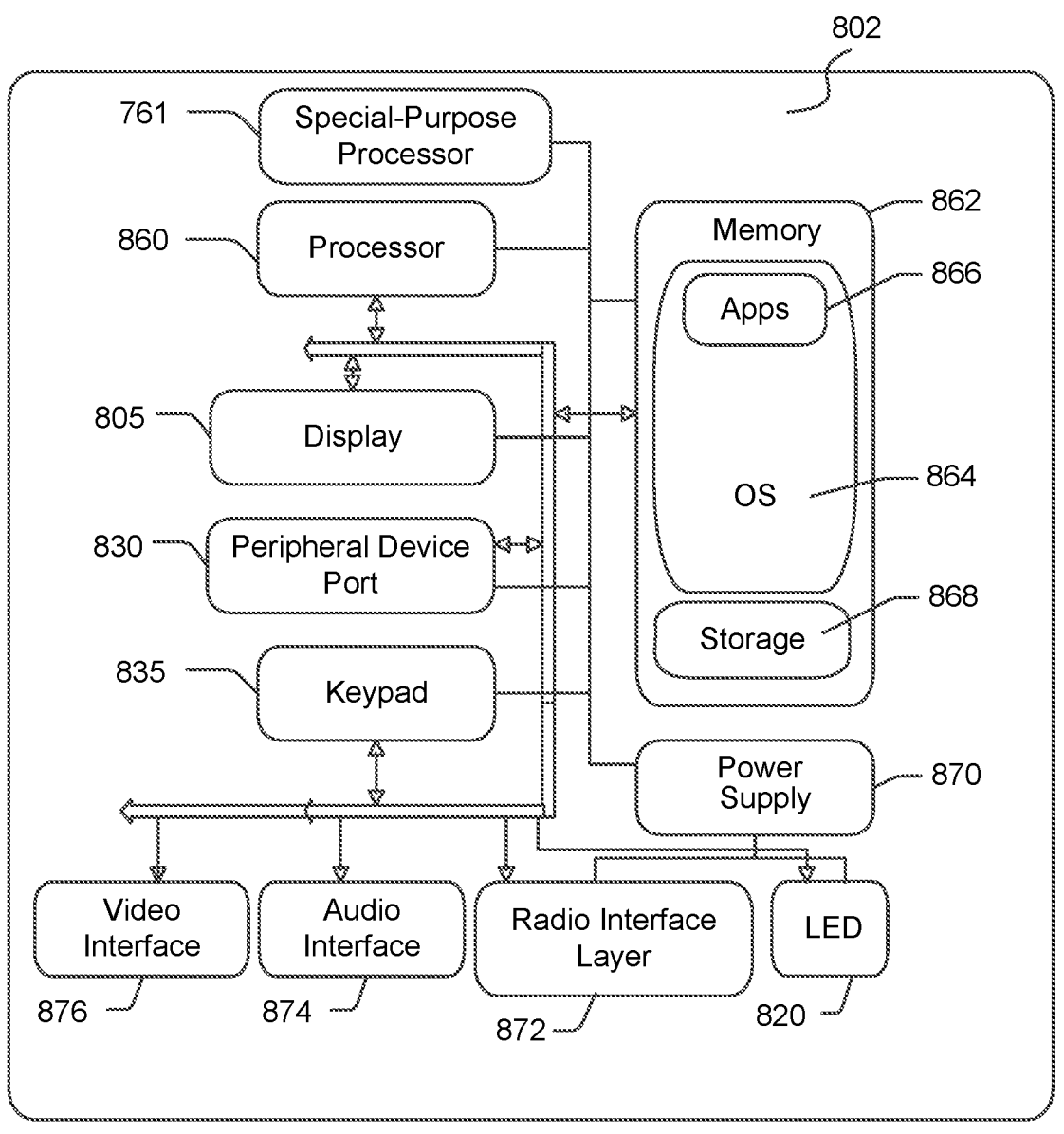
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device 102 in FIG. 1) may be a mobile computing device. With reference to FIG. 8A, one aspect of a mobile computing device 800 for implementing the aspects is illustrated. In a basic configuration, the mobile computing device 800 is a hand-held computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., an application server 110 and a classifier generator 140 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for training a classifier according to at least the examples provided in the sections below:

(A1) In one aspect, some embodiments include a computer-implemented method (e.g., 600) of training a classifier, the method including: receiving (604) a joint graph (e.g., 144, 308), where the joint graph includes nodes (e.g., 310) and directional edges (e.g., 312), and where each node is either a document type or a label type; generating (608), based on graph convolution of the joint graph, a plurality of multi-dimensional vector representations (e.g., 210A-C) of a document (e.g., 310), where the document is represented by a document node in the joint graph (e.g., 144, 308), and where each multi-dimensional vector representation (e.g., 210A) of the document corresponds to a distinct level of neighboring nodes from the document node in the joint graph; and generating (610), using a residual layer of a neural network (e.g., 220A-C), transformed multi-dimensional vector representations (e.g., 230A-C) of the document based on the generated plurality of multi-dimensional vector representations (e.g., 210A-C) of the document, where the residual layer includes a residual network and a skip connection (e.g., 220A-C). The method further includes generating (612), using label attention (e.g., 242A-C, 244A-C, 246A-C), a plurality of per-label multi-dimensional vector representations (e.g., 245A-C) of the document, where each per-label multi-dimensional vector representation of the document corresponds to a label of a plurality of labels, and wherein the label attention applies a variable weighting (e.g., 242A-C, 244A-C, 246A-C) to one or more of the transformed multi-dimensional vector representations (e.g., 230A-C) of the document to generate the per-label multi-dimensional vector representations (e.g., 245A-C); training (614) a classifier (e.g., 252A-D) for each label of the plurality of labels; and transmitting (616) a plurality of trained classifiers (e.g., 252A-D) for deployment in a label prediction process.

(A2) In some embodiments of the method of A1, the level of neighboring nodes from the document node corresponds to a number of hops from the document node in the joint graph, and the label attention for a tail label places a higher weighting on a multi-dimensional vector representation of the document generated based on a higher level of neighboring nodes.

(A3) In some embodiments of the method of A1 or A2, the plurality of multi-dimensional vector representation of the document includes a first multi-dimensional vector representation (e.g., vector 210A) based on nodes within one hop from the document node, a second multi-dimensional vector representation (e.g., vector 210B) based on nodes within two hops from the document node, a third multi-dimensional vector representation (e.g., vector 210C) based on nodes within three hops from the document node.

(A4) In some embodiments of the method of A1-A3, the graph convolution includes vectorising features of documents and labels associated with nodes within a predetermined number of hopes from the document node to generate the multi-dimensional vector representations of the document.

(A5) In some embodiments of the method of A1-A4, a number of the plurality of labels is at least a million, and a number of the plurality of per-label multi-dimensional vector representation of the document is at least a million.

(A6) In some embodiments of the method of A1-A5, the method further includes: deploying (616) the plurality of trained classifiers for a label prediction process, receiving a document, generating (620), using a subset of the plurality of trained classifiers, a set of recommendation candidate labels for the received document, and transmitting (622) the generated recommendation candidate labels as a response to the document.

(A7) In some embodiments of the method of A1-A6, the document includes at least one of: a query in a web search application, a query in a sponsored search application, a product in a product recommendation application, or a content title in a content recommendation application.

(A8) In some embodiments of the method of A1-A7, each label the plurality of labels includes one of: a webpage as a search result in the web search application, a piece of directed content in the sponsored search application, another product in the product recommendation application, or another content title in a content recommendation application.

In another aspect, some embodiments include a system (e.g., system 802) having one or more processors and memory, the memory storing computer-executable instructions that when executed by the processor cause the system to perform any of the methods described herein (e.g., methods A1-A8).

In another aspect, some embodiments include a computer-readable non-transitory recording medium (e.g., system memory 704) storing computer-executable instructions that when executed by a processor cause a computer system to perform any of the methods described herein (e.g., methods A1-A8).

Any of the one or more above aspects in combination with any other of the one or more aspect. Any of the one or more aspects as described herein.

What is claimed is:

1. A computer-implemented method of training a classifier, the method comprising:

receiving a joint graph, wherein the joint graph includes nodes and directional edges, and wherein each node is either a document type or a label type;

generating, based on graph convolution of the joint graph, a plurality of multi-dimensional vector representations of a document, wherein the document is represented by a document node in the joint graph, and wherein each multi-dimensional vector representation of the document corresponds to a distinct level of neighboring nodes from the document node in the joint graph, generating, using a residual layer of a neural network, transformed multi-dimensional vector representations of the document based on the generated plurality of multi-dimensional vector representations of the document, wherein the residual layer includes a residual network and a skip connection;

generating, using label attention, a plurality of per-label multi-dimensional vector representations of the document, wherein each per-label multi-dimensional vector representation of the document corresponds to a label of a plurality of labels, and wherein the label attention applies a variable weighting to one or more of the transformed multi-dimensional vector representations of the document to generate the per-label multi-dimensional vector representations;

training a classifier for each label of the plurality of labels; and transmitting a plurality of trained classifiers for deployment in a label prediction process.

2. The computer-implemented method of claim 1, wherein the level of neighboring nodes from the document node corresponds to a number of hops from the document node in the joint graph, and wherein the label attention for a tail label places a higher weighting on a multi-dimensional vector representation of the document generated based on a higher level of neighboring nodes.

3. The computer-implemented method of claim 1, wherein the plurality of multi-dimensional vector representation of the document includes a first multi-dimensional vector representation based on nodes within one hop from the document node, a second multi-dimensional vector representation based on nodes within two hops from the document node, a third multi-dimensional vector representation based on nodes within three hops from the document node.

4. The computer-implemented method of claim 1, wherein the graph convolution includes vectorising features of documents and labels associated with nodes within a predetermined number of hopes from the document node to generate the multi-dimensional vector representations of the document.

5. The computer-implemented method of claim 1, wherein a number of the plurality of labels is at least a million, and wherein a number of the plurality of per-label multi-dimensional vector representation of the document is at least a million.

6. The computer-implemented method of claim 1, the method further comprising:

deploying the plurality of trained classifiers for a label prediction process;

receiving a document;

generating, using a subset of the plurality of trained classifiers, a set of recommendation candidate labels for the received document; and transmitting the generated recommendation candidate labels as a response to the document.

7. The computer-implemented method of claim 1, wherein the document includes at least one of:

a query in a web search application, a query in a sponsored search application, a product in a product recommendation application, or a content title in a content recommendation application.

8. The computer-implemented method of claim 1, wherein each label the plurality of labels includes one of:

a webpage as a search result in the web search application, a piece of directed content in the sponsored search application, another product in the product recommendation application, or another content title in a content recommendation application.

9. A system for learning classifiers for labels in an extreme classification processing, the system comprises:

a processor; and a memory storing computer-executable instructions that when executed by the processor cause the system to:

receive a joint graph, wherein the joint graph includes nodes and directional edges, and wherein each node is either a document type or a label type;

generate, based on graph convolution of the joint graph, a plurality of multi-dimensional vector representations of a document, wherein the document is represented by a document node in the joint graph, and wherein each multi-dimensional vector representation of the document corresponds to a distinct level of neighboring nodes from the document node in the joint graph, generate, using a residual layer of a neural network, transformed multi-dimensional vector representations of the document based on the generated plurality of multi-dimensional vector representations of the document, wherein the residual layer includes a residual network and a skip connection;

generate, using label attention, a plurality of per-label multi-dimensional vector representations of the document, wherein each per-label multi-dimensional vector representation of the document corresponds to a label of a plurality of labels, and wherein the label attention applies a variable weighting to one or more of the transformed multi-dimensional vector representations of the document to generate the per-label multi-dimensional vector representations;

train a classifier for each label of the plurality of labels; and transmit a plurality of trained classifiers for deployment in a label prediction process.

10. The system of claim 9, wherein the level of neighboring nodes from the document node corresponds to a number of hops from the document node in the joint graph, and wherein the label attention for a tail label places a higher weighting on a multi-dimensional vector representation of the document generated based on a higher level of neighboring nodes.

11. The system of claim 9, the computer-executable instructions when executed further causing the system to:

deploy the plurality of trained classifiers for a label prediction process;

receive a document;

generate, using a subset of the plurality of trained classifiers, a set of recommendation candidate labels for the received document; and transmit the generated recommendation candidate labels as a response to the document.

12. The system of claim 9, wherein the document includes at least one of:

a webpage as a search result in the web search application, a piece of directed content in the sponsored search application, another product in the product recommendation application, or another content title in a content recommendation application, and wherein the label includes at least one of:

a query in a web search application, a query in a sponsored search application, a product in a product recommendation application, or a content title in a content recommendation application.

13. A computer-readable non-transitory recording medium storing computer-executable instructions that when executed by a processor cause a computer system to:

receive a joint graph, wherein the joint graph includes nodes and directional edges, and wherein each node is either a document type or a label type;

generate, based on graph convolution of the joint graph, a plurality of multi-dimensional vector representations of a document, wherein the document is represented by a document node in the joint graph, and wherein each multi-dimensional vector representation of the document corresponds to a distinct level of neighboring nodes from the document node in the joint graph, generate, using a residual layer of a neural network, transformed multi-dimensional vector representations of the document based on the generated plurality of multi-dimensional vector representations of the document, wherein the residual layer includes a residual network and a skip connection;

generate, using label attention, a plurality of per-label multi-dimensional vector representations of the document, wherein each per-label multi-dimensional vector representation of the document corresponds to a label of a plurality of labels, and wherein the label attention applies a variable weighting to one or more of the transformed multi-dimensional vector representations of the document to generate the per-label multi-dimensional vector representations;

train a classifier for each label of the plurality of labels; and transmit a plurality of trained classifiers for deployment in a label prediction process.

14. The computer-readable non-transitory recording medium of claim 13, wherein the level of neighboring nodes from the document node corresponds to a number of hops from the document node in the joint graph, and wherein the label attention for a tail label places a higher weighting on a multi-dimensional vector representation of the document generated based on a higher level of neighboring nodes.

15. The computer-readable non-transitory recording medium of claim 13, the computer-executable instructions when executed further causing the system to:

deploy the plurality of trained classifiers for a label prediction process;

receive a document;

generate, using a subset of the plurality of trained classifiers, a set of recommendation candidate labels for the received document; and transmit the generated recommendation candidate labels as a response to the document.

\* \* \* \* \*